Dec. 28, 1948.  F. J. SIGMUND ET AL  2,457,740
FLUID-PROOF WINDING ELEMENT
Filed Dec. 2, 1944  2 Sheets-Sheet 1
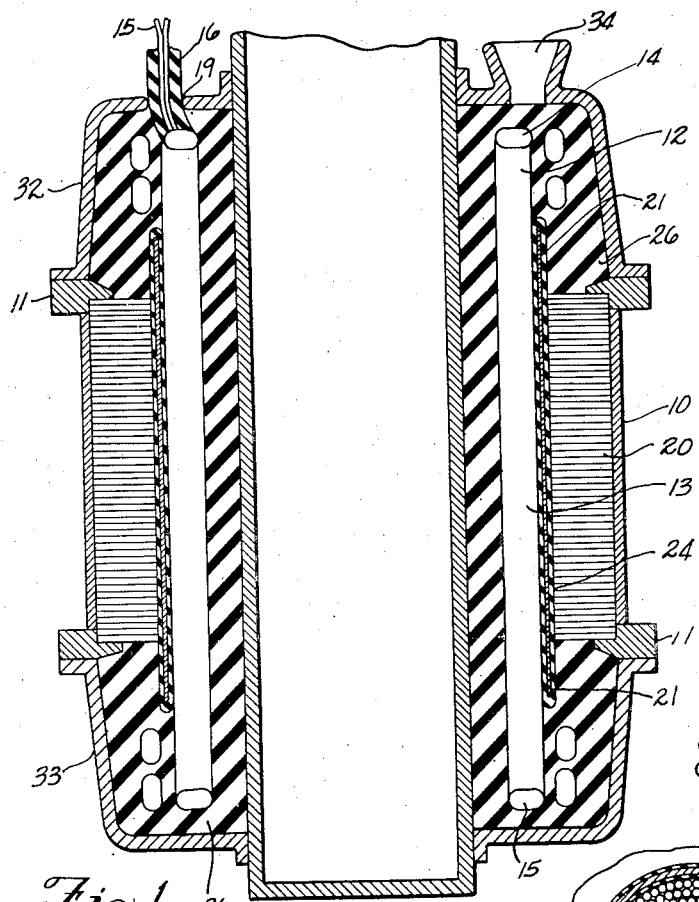
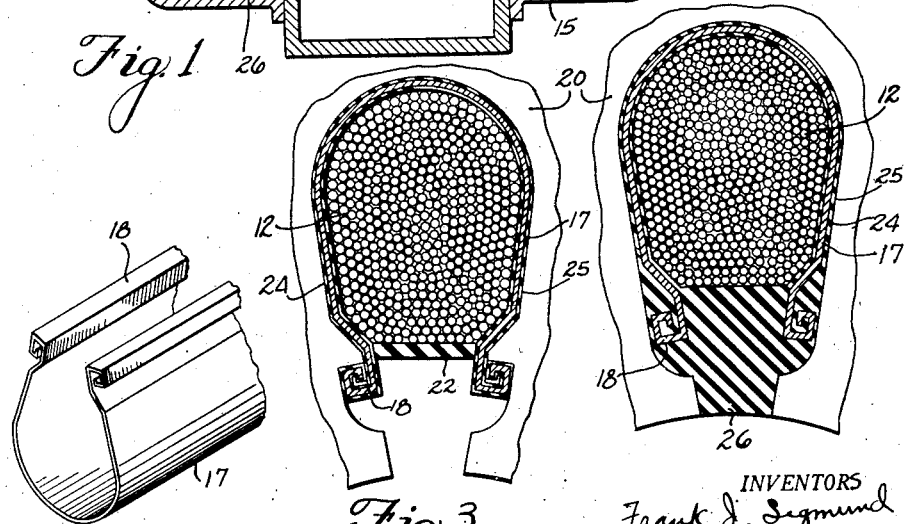
INVENTORS
Frank J. Sigmund
William S. Hlaven
BY
Stoodling and Krost
attys Dec. 28, 1948. F. J. SIGMUND ET AL 2,457,740
FLUID-PROOF WINDING ELEMENT
Filed Dec. 2, 1944 2 Sheets-Sheet 2
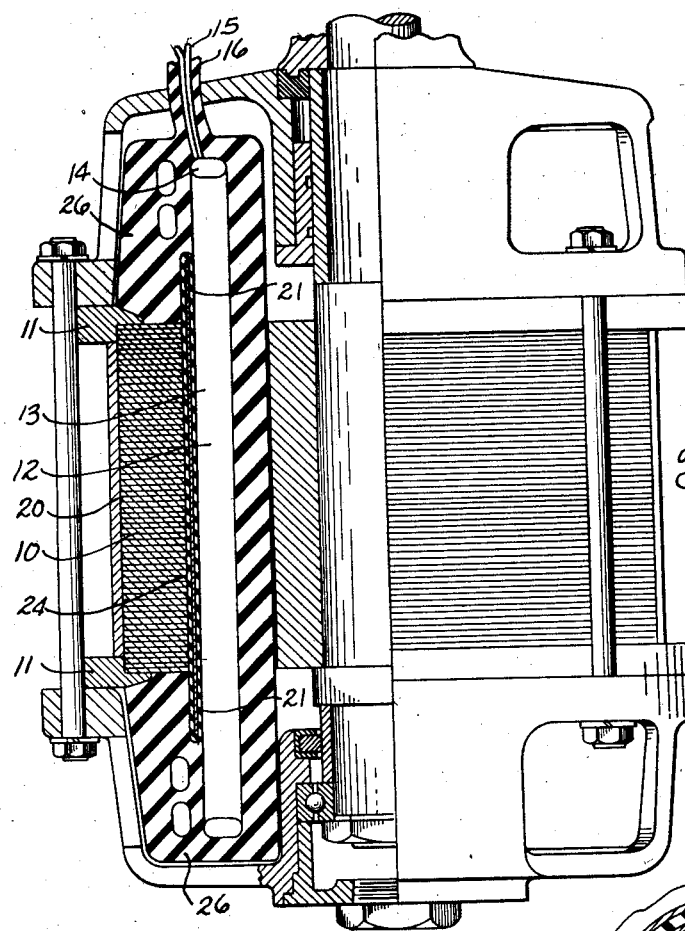
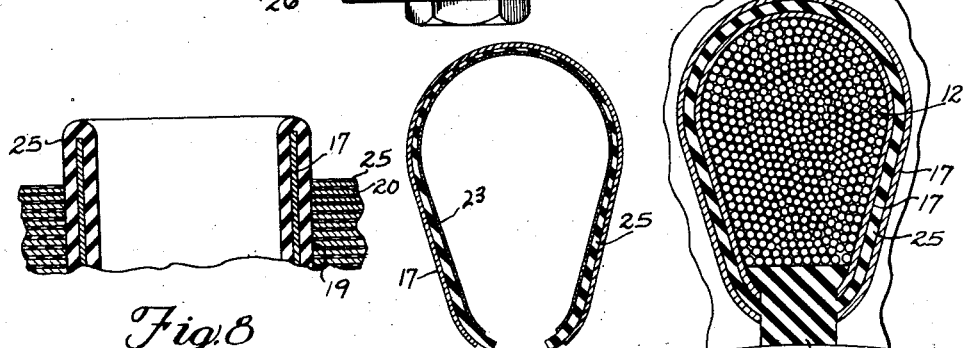
INVENTORS
Frank J. Sigmund
BY William S. Hlavin
Hoodling and Kroat
attys.

Patented Dec. 28, 1948

2,457,740

UNITED STATES PATENT OFFICE 2,457,740

FLUIDPROOF WINDING ELEMENT

Frank J. Sigmund and William S. Hlavin, Cleveland, Ohio, assignors to Sigmund Corporation, a corporation of Ohio Application December 2, 1944, Serial No. 566,368

12 Claims. (Cl. 171—252)

Our invention relates in general to winding elements for electric machines or devices and more particularly to fluid and moisture-proof winding elements which may be submersed in a fluid or operated at high speed and voltages in a highly humid atmosphere, and which will withstand a great deal of vibration without damage.

The term "fluid-proof" used herein and in the claims refers to complete exclusion of moisture and fluids. In short, a "fluid-proof" material would refer to a material which would neither transmit a fluid or moisture through pores or other openings, nor by hydroscopic capillary action.

An object of our invention is to completely exclude fluids and moisture from the windings of a dynamo-electric machine.

Another object to our invention is to provide a fluid-proof sleeve for the winding slots of a dynamo-electric machine or other devices.

Another object of our invention is to provide a fluid or moisture-proof sleeve for the winding lots of a dynamo-electric machine or other devices which takes up relatively little space of the slots and therefore allows more room for winding.

Another object of our invention is to provide a maximum amount of power in an electric motor disposed to run under high humidity conditions or immersed in a fluid.

Another object of our invention is to provide a fluid or moisture-proof magnetizable core requiring relatively little hand assembly work to fluid or moisture-proof the windings of the core.

Another object of our invention is to produce a fluid and moisture-proof envelope for an expandible core which will seal more tightly under running conditions and will not be subjected to excessive internal strain and thereby be cracked open.

Another object of our invention is to provide a method of producing a fluid and moisture-proof envelope for an electric machine or device in which the core of the machine or device is not contracted away from the envelope after the envelope is thermally set during manufacture.

Another object of our invention is to provide a fluid and moisture-proof lead-in cable for a fluid and moisture-proof motor.

Another object of our invention is to coat the contacting surfaces of the individual laminations of a laminated core, and split metallic sleeves surrounding the windings in the slots of the core, with an insulating material which is applied in a liquid state and capable of corroding or pitting said surfaces while in the fluid state, but becoming chemically neutral when set, and casting a chemically neutral insulating material about the winding heads and closing the splits of the sleeve, with the said previously deposited coatings uniting with, and forming an integral body with, said cast material.

Another object of our invention is to provide a method for fluid and moisture-proofing the windings of a dynamo-electric machine which does not require degreasing of the parts after assembly and before applying a fluid and moisture-proof envelope material.

Another object of our invention is to provide a method of fluid and moisture-proofing the windings of an electric machine or device which does not require high pressure and temperature, and completely envelopes the windings without damaging or displacing same.

Other objects and a fuller understanding of our invention may be had by referring to the following description and claims, taken in conjunction with the accompanying drawing, in which:

Figure 1 is a cross-sectional view of a motor core and winding in a suitable casting mold with a lead-in cable extending to the exterior of the mold;

Figure 2 is a perspective of a core slot sleeve having a labyrinth formed longitudinal edge;

Figure 3 is an end view of a sleeve of the type shown in Figure 2 with a coating of materials on the surface thereof as the sleeve appears in the core slots before casting;

Figure 4 illustrates the appearance of the sleeve of Figure 3 after casting;

Figure 5 is a view partially in cross-section showing the appearance of the fluid and moisture-proof motor when finished;

Figure 6 is an alternative type of fluid and moisture-proof sleeve as it appears after casting;

Figure 7 is an alternative type of sleeve employing variable thicknesses of insulating material to protect against the entrance of fluids and moisture; and Figure 8 is an enlarged cross-sectional view of the end of a sleeve extending from the core and illustrates the magnetizable core as having an insulating coating separating the individual laminations.

It is well known in the art of electric motor manufacture, that the current carrying windings of the motor must be completely protected against moisture and fluid in order to prevent electrical breakdown. This is true even though the magnetizable core of the machine, as well as other parts, may be completely saturated with moisture. There have been many attempts to fluid and moisture-proof the windings of a dynamo-electric machine including pressure molding of semi-plastic materials such as Bakelite, the provision of closed tubes inserted in the slots of the magnetizable core, and various other means. It has generally been found that injection, or pressure molding, of semi-plastic materials such as Bakelite requires a great deal of careful work and often results in an incomplete job of enclosing the winding. This difficulty is even more pronounced if the magnetizable core is to be left uncovered on the outside. Further, when high temperatures are required to thermally set the semi-plastic, the magnetizable core of the machine is expanded to a considerably degree. After the semi-plastic material is then set or cured, the magnetizable core shrinks back to its original room temperature size and thus produces a space between the magnetizable core and the thermally set plastics. This strain may be even so great as to produce cracks in the plastic. Further, under running conditions, the magnetizable core seldom ever again reaches the temperature at which the semi-plastic material was thermally set, and therefore, the core never completely expands to fill the space existing between the coating and the core. It will readily be seen, then, that moisture and fluid might easily work in between the metal and the plastic and cause a breakdown in the windings unless an excessive mass of material completely encloses the magnetizable core on the outside thereof. Of course, providing a large mass of insulating material on the outside of the core prevents the ready escape of heat and produces an undesirable overheating.

Although tubes have been used to a considerable degree of success, much hand labor is needed to thread each individual winding wire through the tubes, and this procedure builds up a prohibitive cost of manufacture. Further, many different types of winding insulatings consume a considerable amount of space in the slots and thereby reduces the number of windings which may be inserted in the core slots. This reduction of coil windings in the slots is known as a reduction in the space factor of the machine. Further, as before indicated, insulation materials are generally not good as heat conductors, and therefore reduce the heat dissipation from the windings to the magnetizable core and hence to the surrounding atmosphere, which is the normal procedure of cooling electric motors.

The applicants have attempted to overcome these problems in the present application. With reference to the Figure 1 of the drawing, we are illustrating our invention as being applied to the stator of a dynamo-electric machine, although it is to be understood that our invention applies to the moisture and fluid-proofing of winding elements of all kinds. In the Figure 5, the stator of the dynamo-electric machine may comprise a magnetizable core 10 which is held together by suitable end rings 11. The magnetizable core is provided with a plurality of open slots 24 to receive the coil sides 13 of the winding elements 12. As an additional protection against moisture, and a cushion against mechanical shock, as well as insulation against unwanted eddy currents, the individual laminations 20 may be coated with a thin coating of insulating material 25 before the magnetizable core is assembled. As illustrated, the winding element has coil heads positioned at the ends of the magnetizable core 10. A terminal lead 15 extends from the coil head 14 and is arranged to be connected to a suitable source of supply.

Metal is a material which is well known for its non-hydroscopic or impermeable properties even in extremely thin sheets. Therefore in order that the coil sides 13 may be as large as possible, a split metal sleeve 17 of relatively thin dimension is inserted in each of the coil slots prior to inserting the coil sides 13 therein. The split sleeves are preferably made of nonmagnetizable material and have a relatively thin wall section in order not to occupy much slot space. As illustrated in the Figure 2, a type of metal sleeve is illustrated with longitudinal edges 18 of the sleeve in the form of a labyrinth. This sleeve may then be coated on either side or preferably on both sides with a very thin coating of insulating material 25 as provided on the individual laminations. This insulating material 25 serves a two fold purpose of insulating the metal sleeve 17 from the slot wall, and also providing a protective coating to the sleeve, whereby dirt and grease are kept off of the sleeve surface during the winding operation of the motor. This coating material 25 is preferably formed of a material which is compatible with the material used to cast the final insulating envelope. That is, the coating 25 should be soluble in the liquid insulating material 26 or at least should be fusible therewith. However, the coating is not essential if the sleeves are cleaned and protected during assembly, whereby a good binding action can be obtained between the final cast material and the sleeves.

After the sleeves 17 are inserted in the core slots 24, the magnetizable core 10 may be wound in any suitable manner such as by inserting individual wires through the splits of the metal sleeves, or by the use of preformed winding coils. In the latter case, the coil sides are merely separated and slipped into the core slots one at a time.

A lead-in terminal 15 is provided to supply power to the winding coil, and is covered with an insulating material 16. The insulating material 16, like the material 25 on the sleeves and laminations, should be compatible with the fluid insulating materials 26, or at least fusible therewith. It will readily be understood then, that the insulation material 16 will be dissolved and completely replaced by the material 26 or that a completely fused area will result on the surface thereof and prevent moisture from entering between the insulating material 16 and the insulating material 26 and reaching the winding coils.

The word "compatible" as used herein, connotes a material which is soluble in the same solvent used with the casting insulating materials 26, and which will harden under the same conditions as the casting insulating material 26. In fact, the sleeve 17 and the laminations 20 may be given a coating of the actual material 26.

Note in Figure 8, that the ends of the sleeve 17, and the coating thereon, extends beyond the ends of the magnetizable core 10. This provision makes the ends of the sleeves 17 easily accessible to the casting insulating material 26.

The type of insulating material 26, which is used to enclose the winding heads 14 and bridge and enclose the splits of the sleeve 17, and the material 25 which is used to coat the laminations and the sleeves of the machine, are of considerable importance. When coating the surface of the laminations 20 and the sleeves 17, it has been found that an insulating material of corrosive nature, while in the fluid state, but chemically neutral in the solid state, is preferable. This type of material is preferable, because the corrosive nature of the liquid material forms pits and abrasions on the surfaces to which the solid material can adhere. It is important, however, that these corrosive materials should be noncorrosive in the solid or polymerized state, because the continued corrosive action would be undesirable. However, all insulating materials are not necessarily corrosive in their normal liquid condition. This corrosive nature, then, can be supplied by the addition of polymerizable organic acids. These acids provide the necessary corrosive nature while in the monomer state, but are chemically inactive in the polymerized state. We have found that several rubber-like materials may be dissolved by a suitable solvent and impregnated with an inhibitor to produce a relatively thin castable fluid. This material will remain in a fluid condition for a long period of time unless the inhibitor is counteracted by a suitable catalyst and a supply of thermal energy provided. It is not always necessary, however, to provide an inhibitor or a catalyst. For example, if the rubber-like material is dissolved and used immediately, it is quite likely that neither an inhibitor nor a catalyst will be necessary. The insulating material and the solvent should be of the type which will polymerize and copolymerize upon the addition of a suitable catalyst, if necessary, and thermal energy to form a nonhydroscopic, or moisture impermeable, material of high insulating properties and having good tensile strength as well as resistance to chemicals including acid, alkalies, corrosives, and gases. It is understood that no corrosive action is desired in the casting material 26, which is poured into the assembled mold to surround the coil heads and bridge and seal the sleeve split. An example of the castable materials used for the material 26, and to which a suitable organic acid may be added to provide the required corrosive action for coating the sleeves and laminations, is as follows: an elastomer which may be natural rubber, neoprene, isoprene, or butadiene dissolved in a styrene monomer or its derivatives. Suitable catalyst and suitable inhibitor may be added, and a suitable compatible plasticizer may be added. Instead of the specifically cited example, any liquid monomer may be substituted for the styrene monomer, which will dissolve the elastomer employed and polymerize or copolymerize with it. The liquid monomer employed should sufficiently dissolve the elastomer as to obtain a result mass after polymerizing of the desired degree of elasticity or resiliency. Suitable monomers, for example, are acrylic acid and its various derivatives, as well as its esters such as methyl methacrylate.

After the magnetizable core has been equipped with coated sleeves, wound, and inserted in the casting mold as hereinafter described, the fluid casting material 26 is then used to completely fill all vacant space in and around the coil heads, and to bridge and seal the splits of the sleeve 17. Suitable dams may first be inserted in the splits of the sleeves to prevent the fluid material 26 from filling the interstices of the windings if so desired. See part 22, Figure 3.

The Figure 1 illustrates a completed electric stator positioned in a suitable mold for receiving an envelope of insulating material. Although any suitable mold may be employed, we illustrate a mold top 32 and a mold bottom 33 positioned on the ends of the magnetizable core, and a center mandrel located centrally of the magnetizable core and the mold ends. The combination of magnetizable core, mold ends, and the center mandrel provides a completely enclosed suitable casting mold into which a fluid insulating material may be poured. A pouring funnel 34 is provided on the mold top 32 for convenience in filling the assembled mold. Also, an opening 19 is provided for the lead-in cable 15, and fits closely thereto. Although the illustration in Figure 1 shows a mold into which the castable material 26 is simply poured, we have found that a slightly better quality casting can be made by subjecting the mold to a slight vacuum during the filling process. When this material is poured into the mold in its liquid condition, the solvent therein attacks the coating 25 on the sleeve and core and either completely dissolves it away, or softens it enough that a good fusion results after the material 26 is set or cured. Thus the envelope coatings are sealed together, the first or primary coating on the sleeve and laminations being partially dissolved and fusing with the material 26, or completely dissolved and replaced by the material 26. The provision of the insulating material 25 on the sleeve 17 eliminates the necessity of the material 26 completely penetrating and surrounding the coil sides 13, and also provides a good clean surface for the material 26 to adhere to after dissolving away the coating 25 on the sleeve in the area of the longitudinal edges 18. In short, the two materials merge and become one.

It will be noted in the Figures 3, 4, 6, and 7, that every sleeve, regardless of type, provides a long and tortuous path for any moisture which may penetrate the laminations of the magnetizable core 10 and reach the sleeve. In the Figure 2, a labyrinth is provided to increase the distance moisture would have to travel before it could reach the inside of the sleeve if it should be able to penetrate the outer coating of the sleeve. Inspection of the other views mentioned will reveal that various changes in the details of construction and the arrangement of the metal and coating thereof may be resorted to without departing from the principles involved of providing a difficult path for moisture to penetrate through to the coil sides, and taking up as little space in the core slots as possible. For example, an alternative type sleeve is illustrated in the Figure 7 in which an inner jacket of tough fabric 23 is in contact with the windings, an intermediate jacket of insulating material, and an outer jacket of impermeable metal to contact the slot walls. The sleeve is rolled or otherwise worked, until the portion of the sleeve intermediate the edges thereof is worked almost free of the intermediate jacket of insulating material to produce a thin cross-section.

After filling the mold as described, the entire assembly may be placed in a warm atmosphere, such as an oven, and heated to a temperature substantially the same as the running or operation temperature of the winding coils in use. A slightly improved casting can be accomplished by maintaining the entire assembly under a slight pressure during the heating period.

It will be noted that throughout this specification we have generally indicated material which will set at a temperature not greatly above the running temperature of the motor, and preferably employ a material of cooler setting temperature. One of the prime objectives of this invention, is to completely envelope the core windings with an even covering of plastic material which will not crack open under operating conditions. We first choose a castable material in preference to an injected or pressure molded, semi-solid material, because a flowing castable material will not push the winding sides against the slot walls or otherwise displace the coil. The second consideration, then is to choose a material setting at a temperature somewhat close to the running temperature of the motor. This choice will permit the core and windings to expand to approximately their normal running position while the castable material is setting. After the castable material becomes solid, and the core begins to cool, the core will not contract to a great extent, because it was never heated very hot as it would have been with a high temperature thermal setting material. The small amount of contraction that is apparent will be permitted without damage because of the elasticity of the material 26. In summary, we choose a material to envelop the core windings which will easily surround the windings without disturbing them, and which will set about a core expanded to its normal running size.

The Figure 5 illustrates a motor employing a magnetizable core and insulated windings as made by the methods herein described. The windings of this motor are completely enclosed in a fluid and moisture-proof envelope made up of a combination of insulating material and metal sleeves. The insulating material is thick in the places where there is no metal and thus prevents the entrance of moisture, and is exceedingly thin in the areas protected by nonhydroscopic metal, and therefore consumes but relatively small amount of space. We have found that this type of moisture-proofing in electric motors reduces the space factor very little and is able to operate completely submersed in water for indefinite periods of time without electrical breakdown.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim as our invention:

1. In a dynamo-electric machine comprising a magnetizable core with coil slots therein, windings with coil sides in said slots and coil heads at the ends of said core, the provision of improved means to make the windings moisture tight, said improved means comprising a coated metallic sleeve in each slot and surrounding said coil sides, said coated sleeve comprising a nonmagnetic split metallic sleeve with a coating of insulating material on at least one side thereof, said insulating coating comprising a material which is fusible with a material of the class including polymerizable or copolymerizable insulating material, a mass of insulating material of the class including polymerizable and copolymerizable materials fused with the sleeve coating at least in the region of the sleeve split and bridging and sealing the sleeve split, and said mass terminating in an annular mass at the ends of the core and encasing the coil heads and fusing with the sleeve coating in the region of the sleeve ends, whereby a thick mass of material protects some parts of the coils from moisture and metal sleeves protect the remainder.

2. In a dynamo-electric machine comprising a magnetizable core with coil slots therein, windings with coil sides in said slots and coil heads at the ends of said core, the provision of improved means to make the windings moisture tight, said improved means comprising a metallic sleeve in each slot and surrounding said coil sides, said sleeve comprising a nonmagnetic split metallic sleeve, a mass of insulating material of the class including polymerizable and copolymerizable materials sealed to the sleeve at least in the region of the sleeve split and bridging and sealing the sleeve split, and said mass terminating in an annular mass at the ends of the core and encasing the coil heads and being sealed to the sleeve coating in the region of the sleeve ends, whereby a thick mass of material protects some parts of the coils from moisture and metal sleeves protect the remainder.

3. In a dynamo-electric machine comprising a magnetizable core having a plurality of winding slots therein and winding coils with coil sides in said slots and coil heads at the ends of the core, the process of providing a moisture-proof envelope for said winding coils comprising the steps of fashioning a split metal sleeve, coating said sleeve on at least one side thereof with a material which is fusible with a polymerizable and copolymerizable material, inserting said coated sleeve in said core slots and inserting the coil sides therein, placing the entire core and winding assembly in a suitable mold and filling said mold and thereby covering said coil heads with a thin liquid material, said material filling and bridging the split of the sleeve and at least partly softening and dissolving said sleeve coating, and causing the thin liquid to polymerize and copolymerize to a hardened condition thereby uniting with the sleeve coating to form a continuous coating about said coil sides and encasing the coil heads in a solid mass of insulating material, whereby a unit moisture-proof enclosure is provided for the winding coils.

4. In a dynamo-electric machine comprising a magnetizable core having a plurality of winding slots therein and winding coils with coil sides in said slots and coil heads at the ends of the core, the process of providing a moisture-proof envelope for said winding coils comprising the steps of fashioning a split metal sleeve, inserting said sleeve in said core slots and inserting the coil sides therein, placing the entire core and winding assembly in a suitable mold and filling said mold and thereby covering said coil heads with a thin liquid material, said material filling and bridging the split of the sleeve and causing the thin liquid to polymerize and copolymerize to a hardened condition thereby sealing to the sleeve to form a continuous enclosure about said coil sides and encasing the coil heads in a solid mass of insulating material, whereby a unit moisture-proof enclosure is provided for the winding coils.

5. In an electrical device comprising a magnetizable core having a plurality of winding slots and winding coils with coil sides in said slots and coil heads at the ends of the core, the provision of moisture-proof closure means for the coils comprising split metal sleeves positioned in the slots and surrounding said coil sides and a mass of polymerizable and copolymerizable insulating material extending along and bridging and sealing the split of the sleeves and terminating in annular rings at the ends of said core to seal the heads and sides into one moisture-proof enclosure.

6. In an electrical device comprising a core having a plurality of slots therein, a winding comprising coils with coil sides in said slots and coil heads at the ends of the core, and a mass of castable resins sealing said winding, the improvement of sleeve members to fit in said slots and surround said coil sides, said improvement comprising a sleeve made of a sheet of said castable resin sandwiched between two dissimilar sheets of material, said dissimilar sheets being narrower than the resin sheet and leaving side areas of free resin sheet, said dissimilar sheets being embedded in the surface of the resin sheet to form a section at least as thin as the free resin side areas, said embedded area being formed into a sleeve with cross-section conforming substantially to the general contour of said slots, said free resin side area being united into one unit mass with the castable sealing resin, whereby said castable resin mass completely envelopes said winding.

7. Improvement of closure means to seal parts of an electrical winding against moisture, said improvement comprising a split metal sleeve formed with the cross-sectional contour of the edges of the sleeve describing a labyrinth, and masses of fluid-proof insulating material surrounding said labyrinth edges and bridging the split in the sleeve and sealing the sleeve.

8. In a dynamo-electric machine comprising a magnetizable core having slots therein and coil sides in said slots, the provision of non-magnetic metallic sleeves each having a continuous unbroken side wall to fit into said slots and surround said coil sides and provide a moisture-proof covering for said coil side, at least said side wall of the sleeve in the slot being coated on at least one side thereof with an electrical insulating material.

9. In a dynamo-electric machine having a laminated magnetic core provided with slots and winding sides in the slots, a flexible moisture and fluid-proof coating separating the laminations of said core, a nonmagnetic split metallic sleeve in each slot surrounding said winding, said sleeve being coated on at least one side thereof with a flexible moisture and fluid-proof material, a mass of insulating material bridging and sealing the split of said sleeve and united homogeneously with said sleeve coating and lamination coating, said mass extending to the ends of the core and forming an annular mass to enclose the winding heads and being united with the coating of the sleeves at the end thereof.

10. In a dynamo-electric machine having a laminated magnetic core provided with slots and winding sides in the slots, a flexible moisture and fluid-proof coating separating the laminations of said core, a nonmagnetic split metallic sleeve in each slot surrounding said winding, a mass of insulating material bridging and sealing the split of said sleeves and being sealed to said sleeve and to the lamination coating, said mass extending to the ends of the core and forming an annular mass to enclose the winding heads and being sealed to the sleeves at the end thereof.

11. In a dynamoelectric machine employing a magnetizable core having coil slots therein, windings with coil sides in said coil slots and coil heads at the ends of said core, the provision of a covering for said windings including a thin wall wrapper impermeable to penetration of moisture for one area to dissipate heat and thick wall sections having sufficient mass to prevent penetration of moisture for other areas, comprising split impermeable nonmagnetic sleeves for each slot to surround said coil sides and extending to the coil heads, said sleeves providing substantially absolute barrier to the passage of moisture therethrough to said coil sides, a self-contained body comprising a polymerizable and copolymerizable mass sealing the split of the sleeves and encasing the coil heads and sealing the ends of said sleeves, said mass being thick to substantially prevent the penetration of moisture therethrough, whereby said impermeable sleeves will provide thin wall protection and dissipate heat but exclude moisture from the coil sides, and said mass will protect the portions of the windings which cannot be encased in a sleeve.

12. The method of moisture sealing an electrical winding in a metal casing of a dynamoelectric machine, comprising selecting a polymerizable and copolymerizable insulating material having a setting temperature substantially in the neighborhood of the operating temperature of the machine, filling the portions to be sealed with the fluid form of said insulating material, raising the temperature of the machine and liquid form of the insulating material to said setting temperature, and holding said machine at said temperature until said insulating material is set into a solid insulating mass.

FRANK J. SIGMUND.
WILLIAM S. HLAVIN.

REFERENCES CITED

The following references are of record in the file of this patent:

UNITED STATES PATENTS

| Number | Name | Date |
| --- | --- | --- |
| 1,137,278 | Peterson | Apr. 27, 1915 |
| 1,524,558 | Kincaid | Jan. 27, 1925 |
| 1,675,419 | Myers | July 3, 1928 |
| 1,925,891 | Apple | Sept. 5, 1933 |
| 2,128,544 | Surjaninoff | Aug. 30, 1938 |
| 2,173,726 | Prinole | Sept. 19, 1939 |
| 2,417,746 | Fletcher | Mar. 18, 1947 |